United States Patent Office 3,564,661
Patented Feb. 23, 1971

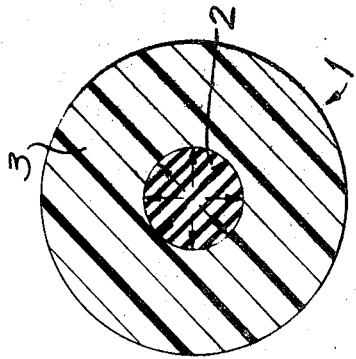
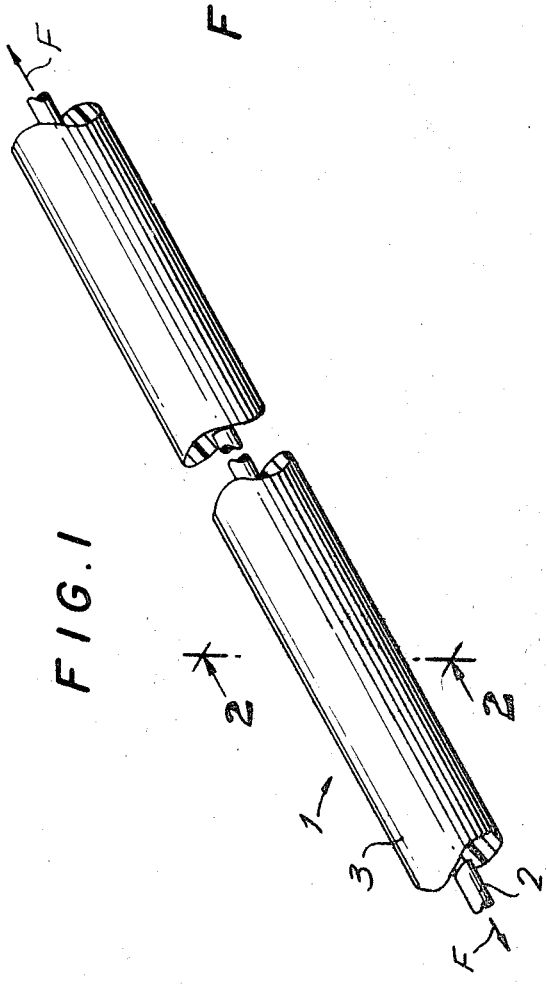
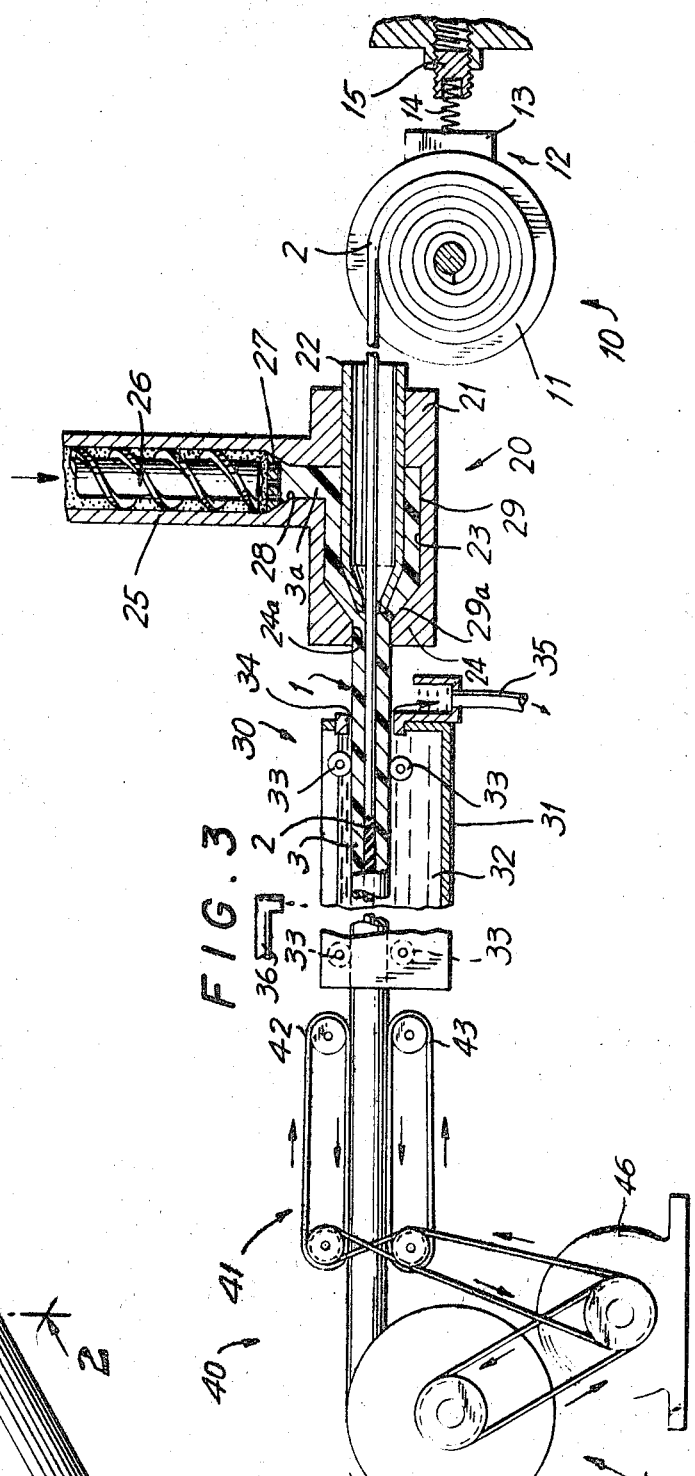
INVENTOR.
WILLIAM J. ATWELL

3,564,661
FLEXIBLE MANDRELS
William J. Atwell, Bloomingdale, N.J., assignor to Uniroyal, Inc., New York, N.Y., a corporation of New Jersey
Filed Nov. 6, 1967, Ser. No. 680,853
Int. Cl. B29c 1/06
U.S. Cl. 18—45                                    8 Claims

ABSTRACT OF THE DISCLOSURE

A flexible mandrel having a thermoplastic outer sleeve which is filled with a more resilient radially compressed material. The outer sleeve is formed about the inner more resilient core while the latter is in longitudinally stretched condition, so that the sleeve will thereafter permanently maintain the core in radially compressed condition.

---

This invention relates to flexible mandrels generally, and more particularly to composite flexible mandrels of relatively long continuous length.

Flexible mandrels for producing long lengths of hose are known. The known flexible mandrels, however, have substantial disadvantages in that they are relatively heavy in weight and have only limited flexibility. For both of the foregoing reasons the known mandrels are, as a practical matter limited in length, since the handling of relatively heavy members having limited flexibility poses a serious pratical problem. Thus, while advantageous over the straight rigid mandrels suitable for manufacturing only relatively short lengths of hose, the known flexible mandrels may be coiled in only relatively large diameter coils which are limited in number. Their limited flexibility, of course, also presents a problem with respect to the size of the supply and take-up reels which are required, as well as with respect to the pressures such mandrels exert on the hose when they are together wound on the take-up reel.

It is a primary object of the present invention, therefore, to provide a flexible mandrel of continuous length exceeding that of comparable present mandrels and which may be readily handled for the production of relatively long continuous lengths of hose.

It is another object of the present invention to provide a mandrel which is lighter in weight than comparable known flexible mandrels and which displays a higher degree of flexibility than comparable known flexible mandrels.

Still another object of the present invention is to provide a mandrel of the above type which can be produced with the close dimensional tolerances required for the mandrel-made-hose process.

A further object of the present invention is to provide a flexible mandrel which may be used in place of the rigid metal mandrels now used for the production of that type of hose which comprises natural or synthetic yarns, or wire reinforcements, in braid or spiral layer form.

Another object of the present invention is to provide a mandrel which does not require a release-type lubricant for removal of the finished hose from the mandrel.

A still further object of the present invention is to provide a mandrel of the above type which contracts away from the inside diameter of the completed hose for good release therefrom.

Yet another object of the present invention is to provide a mandrel of sufficient flexibility to permit being wound, together with the hose formed thereon, on relatively small diameter reels or spools, without exerting undue stress on such hose as a result of such winding.

A concomitant object of the present invention is to provide a method for making mandrels of the above type.

A still further object of the present invention is to provied a mandrel of the above type which is capable of withstanding the temperatures encountered in the production of hose and which will provide hose having a very smooth bore.

Briefly stated, there is provided in accordance with one embodiment of this invention, a composite mandrel having an inner relatively resilient core member and an elongated flexible relatively less resilient outer sleeve surrounding the core and at least slightly radially compressing the latter. The mandrel may be formed by longitudinally stretching the elongated resilient core member and extruding an outer sleeve of thermoplastic material thereabout while the core is in stretched condition. When the thermoplastic material of the outer sleeve has set, and the longitudinal stretching forces on the core member are released, the core will, in response to such release, tend to expand radially but will be restrained from so expanding by the now set outer sleeve member and will thus be maintained in radially compressed condition.

While the specification concludes with claims particularly pointing out and distinctly claiming the subject matter of this invention, it is believed that the invention will be better understood from the following description taken in conjunction with the accompanying drawings, in which:

FIG. 1 is a partial, partly-sectional, perspective view of a composite mandrel according to one embodiment of the present invention;

FIG. 2 is a transverse section taken through the mandrel shown in FIG. 1; and

FIG. 3 is a schematic illustration of apparatus for making a mandrel in accordance with the present invention.

In carrying out the process of making a composite flexible mandrel according to the present invention, a long continuous strip 2 (FIG. 1) of elastomeric, i.e. relatively resilient material, for example a butyl (solid or sponge) rubber, is fed from a supply means 10 (FIG. 3) through an extruder crosshead 20 and a cooling means 30 to a take-up means 40 comprising a traction means 41 and a take-up drum 45. A drive means 46 is operatively connected in well known manner to a pair of opposed traction belts 42 and 43 of the traction means 41 for driving the latter in the direction indicated by the arrows in FIG. 3. The opposed traction belts 42 and 43 are preferably driven at a continuous, uniform, rate corresponding to the winding speed of drum 45 which latter is also suitably driven by the drive means 46.

The supply means 10 may be in the form of a reel or spool 11 on which the elastomeric strip 2 is preferably spirally wound. Supply means 10 preferably also includes a retarding means 12, which may be of well known construction. For example, the means 12 may include a friction member 13 which is urged by a spring 14, having suitable adjustment means 15, against a peripheral surface of reel 11, for applying any desired uniform frictional retarding force to the reel. It will be seen that means 15 permit the friction braking device 12 to be readily adjusted to provide the required retarding force for any desired amount of stretch of the preferably cylindrical strip 2 between the traction means 41, pulling strip 2, and the frictionally retarded supply spool 11. Of course, stretching of the elastomeric strip 2 longitudinally thereof, as described above, reduces the diameter thereof along its length in proportion to such longitudinal stretching force. The strip 2, therefore, when passing through the extruder crosshead 20, is in longitudinally stretched condition and displays a diameter at least slightly smaller than the diameter of the strip 2 in unstretched condition.

Thus, the strip 2 is in stretched condition (FIG. 3), when the thermoplastic material 3a is applied thereto, in extruder crosshead 20, in the form of a sleeve 3.

The extruder crosshead 20 (FIG. 3) comprises a housing 21 defining a bore 23 which communicates at one end thereof with an extruder die portion 24 through which the stretched strip 2 passes coaxially. A tubular inner member 22 is suitably fixed to housing 21 inside of and coaxially with bore 23.

Connected to the extruder crosshead housing 21, in well known manner, is a cylinder head 25 which may be fastened thereto by suitable fastening means, for example, bolts (not shown). The cylinder 25 contains a feed screw 26 which, when it is rotated, forces plastic material, under high pressure, through a breaker plate 27 and radial passage 28 into the annular space 29 formed between bore 23 and tube 22. From the space 29 the plastic 3a flows through an annular inwardly tapering space 29a leading to the die opening 24a of die portion 24 where the plastic 3a contacts and forms a sleeve about the strip 2 as the latter is advanced therethrough.

The size of die opening 24a, of course, determines the outside diameter of the completed mandrel 1, which outside diameter is chosen to correspond to the inside diameter of the hose or similar elongated tubular article which it is desired to manufacture with the flexible mandrel of the foregoing type.

From the extruder head 20, the strip 2, with an extruded coating, or sleeve 3, of thermoplastic material on it, passes through the cooling means 30 illustrated schematically in FIG. 3 as a tank 31 having a cooling liquid, for example water 32, therein through which the mandrel 1 is guided on suitable free-wheeling rollers 33. The tank 31 should have sufficient length to provide for the setting of the plastic material of sleeve 3 during passage of the mandrel through the tank.

A straight-line horizontal path is preferably provided for the mandrel through the tank 31, with the water level preferably maintained above the upper portions of the mandrel as it passes therethrough. An annular member 34 provides an inlet opening into tank 30 and preferably has a diameter slightly larger than the outside diameter of sleeve 3. A suitable drain 35 is provided to carry away spillage, while a suitable source 36 may be provided for replenishing the supply of water in the tank.

As previously noted, the mandrel 1 is drawn through the extruder head 20 and through the cooling means 30 by a caterpillar arrangement 41 which is illustrated schematically as comprised a pair of endles belts 42 and 43 arranged so as to oppose each other in parellel planes. Both of the belts are driven, preferably by the variable speed motor 46. The belts frictionally engage diametrically opposite surface portions of the mandrel to pull the latter in longitudinal direction. From the caterpillar 41 the completed mandrel 1 passes to a take-up mechanism which is illustrated schematically as comprising a motor driven take-up reel 45.

The composite mandrel described herein represents an important improvement over mandrels heretofore available. In accordance with the present invention a mandrel 1 of relatively long continuous length may be produced. Thus, in accordance with the present invention readily usable mandrels 50 to 5000 feet, or more, in length, may be produced with outside diameters in the range of approximately ⅛ to approximately 2 inches.

The arrows F—F (FIG. 1) indicate the direction of longitudinal stretching force applied to the inner core 2 of resilient material, during the extrusion thereon of the thermoplastic material 3a, forming sleeve 3 thereabout, and during setting of the material 3a of sleeve 3. The arrows illustrated in FIG. 2 of the drawings show the direction of the radial forces with which the inner core 2 presses outwardly against the inner surface of outer sleeve 3 after the latter has set and after the longitudinal stretching force F—F (FIG. 1) has been released. It will be obvious that in response to the application of the longitudinal stretching force F—F the elongated, resilient, preferably cylindrical strip 2 displays a decreased diameter along the length thereof between the points where the force F—F is applied, namely, between the traction means 41 and the supply means 10. It is on this reduced diameter core, that the material 3a is extruded. Thus, the stretched inner core of resilient material 2 entirely fills the internal passage defined by the extruded sleeve 3. It will be obvious that when the force F—F is released, and the core 2 tries to expand back into non-stretched condition thereof, radially outwardly directed pressure will be exerted by the core 2 against the inner wall of sleeve 3, as shown by the arrows in FIG. 2. This pressure prevents a separation of core and sleeve during later use of the mandrel and assures a uniform internal support for the outer sleeve 3 along its entire length. As will be explained more fully below, the core 2 continues to provide this internal support even when sleeve 3 expands radially in response to such elevated temperatures as are normally encountered during the hose-making process.

In the production of hose on a mandrel a layer of rubber or plastic material is normally first extruded over the mandrel. Yarn or wire reinforcement is then wound, continuously spiraled, or otherwise applied, around the extruded rubber or plastic layer thus formed on the mandrel. Thereafter a second layer of rubber or plastic material is, if desired, extruded or otherwise applied over the reinforcement layer. The rubber or plastic material of the hose is then vulcanized at temperatures ranging approximately from 298° to 350° F. Vulcanization of the hose, of course, takes place with the mandrel still in the hose so that the mandrel materials must be able to withstand the vulcanization temperatures. According to the preferred embodiment of the present invention the outer sleeve 3 of the composite flexible mandrel 1 consists of a high-temperature resistant thermoplastic material and preferably a material exhibiting a high thermal coefficient of expansion. Eramples of such materials are resins of polyamide, acetal, polyphenyleneoxide, polysulfone, polypropylene, etc. As an example, a polyamide material having a thermal coefficient of expansion of approximately $4.5 \times 10^{-5}$ in./in./° F. has been found suitable.

The relatively high thermal coefficient of expansion assures that the thermoplastic material of sleeve 3 will tend to expand radially, to a greater extent than the reinforced hose, during the vulcanization stage of the hose-making process to thereby create increased pressure at the interior of the hose at such time. This has been found to be advantageous to insure a high density and homogeneity of the hose wall and a smooth bore therein.

After vulcanization of the hose, the mandrel 1, response to being cooled, contracts to its original dimensions while the hose substantially remains at the dimension at which it has been vulcanized. The mandrel thus contracts away from the inside surface of the hose.

The amount of stretching of the elastomeric inner core 2 prior to forming of the thermoplastic sleeve 3 thereon is chosen of such magnitude (preferably approximately 123 to 280% of its unstretched length) that the elastomeric core material 2 will remain at least slightly compressed by sleeve 3 even when sleeve 3 has expanded to its maximum radial dimensions as a result of the application thereto of heat at the aforesaid vulcanization temperatures, i.e., the temperatures encountered during a normal hose-making process. Contact is, therefore, maintained between the outer thermoplastic sleeve member 3 and the inner elastomeric core member 2 despite substantial expansion of the thermoplastic sleeve 3 during elevated temperature portions of the hose making process.

The inherent properties of the thermoplastic material of sleeve 3 permit it to be readily formed with a smooth, continuous, outer surface displaying relatively low static and dynamic friction characteristics which, together with the above mentioned contraction of sleeve 3 away from the hose inside diameter, in response to cooling, provide the mandrel according to the present invention with excellent "release" properties, i.e., properties which facilitate removal of the mandrel from the hose. The need for a release lubricant as a prerequisite to removal of the hose is thus eliminated. This, in turn, results in a significant reduction in contaminates present on the inner surface of the hose, contaminates which would otherwise have to be removed at considerable expense.

As a result of the smooth outer surface possible on a mandrel having a sleeve of thermoplastic resin, a hose with an unusually smooth bore may be produced. Such hoses have the advantage of reduced frictional losses permitting freer flow of materials therethrough and a reduction in pressure loss. While the aforesaid expansion, contraction and reduced friction, properties could be achieved as well with a solid thermoplastic mandrel, the latter would have the disadvantage of not possessing sufficient flexibility, particularly in the case of large diameter mandrels, i.e., those of ⅝ to 2 inches in diameter. The thermoplastic materials mentioned are relatively rigid and the flexibility thereof is limited so that long, large diameter, solid mandrels made therefrom would become rather awkward, if not impossible, to handle. The foregoing weight and flexibility problems, of course, would provide a practical limit to the length of such solid thermoplastic mandrels and thus limit the length of hose which can be manufactured thereon. Limited mandrel flexibility, of course, means large diameter take-up drums for the completed hose since the latter is wound while still on the mandrel.

The composite mandrel according to the present invention overcomes the foregoing disadvantages without loss of any of the advantages noted above. Thus, by forming the inner core 2 of elastomeric material, for example synthetic sponge rubber such as a butyl, and having a lower density than the thermoplastic material of the sleeve 3, the total weight of the mandrel is substantially reduced as compared with the weight of a comparable solid thermoplastic mandrel. For example, a composite mandrel having an approximately ¾ inch outside diameter and an inner core 2 having an outside diameter of approximately ½ inch would weigh approximately ⅒ of a pound per foot of length where the sleeve 3 consists of Du Pont's Zytel 91 (a polyamide resin), and the core 2 consists of a 5 pound per cubic foot density sponge rubber. On the other hand, the weight of a comparably sized solid thermoplastic mandrel of Zytel 91 would be approximately ⅖ of a pound per foot of length. Furthermore, and even more importantly, the flexibility of the cmoposite mandrel is substantially greater than the flexibility of a solid thermoplastic flexible mandrel of comparable size. It has been found that a solid thermoplastic ¾" O.D. mandrel requires the application of approximately 18% to 20% more energy to flex than a similarly dimensioned composite mandrel having a ½" diameter core of relatively lower modulus solid butyl rubber and an outer jacket of relatively higher modulus thermoplastic material.

Consequently, a composite mandrel according to the present invention is much easier to handle, because of its reduced weight and increased flexibility, than a solid flexible mandrel of comparable size. Such composite mandrels may therefore be readily used for making continuous hose of 5,000 feet, or more, even in sizes of 1" diameter, or larger, while similarly dimensioned solid flexible thermoplastic mandrels having a length of even 150 feet represent a substantial problem in handling so that, as a practical matter, longer lengths would rarely, if ever, be used.

As seen from the above, the use of an elastomeric inner core member 2 significantly increases the flexibility and reduces the weight of the mandrel as compared to a solid thermoplastic mandrel.

As is well known to those skilled in the hosemaking art, after the hose has been vulcanized the mandrel is removed from the hose generally by the application of fluid, under pressure, to one end extremity of the mandrel, forcing the latter through the hose and out the opposite open end thereof. A composite mandrel, therefore, without some means of restraining the inner core member within the outer sleeve member, could result in the inner member being separated from, i.e., forced out of, the outer member during the application of such fluid under pressure. The pre-stressed inner core member 2, being forcefully restrained within sleeve 3 as a result of the radial compressive forces exerted thereon, readily resists separation or "blow-out" when the mandrel is subjected to fluid pressures exerted on one end of the composite structure when it is desired to remove the mandrel from the hose. It is further desirable to maintain the intimate contact between the inner and outer mandrel members during coiling of the mandrel on spool 45, since the pressure exerted by core 2 reduces the tendency of the mandrel to become oval and also acts to prevent collapse of the madrel.

An additional advantage of the more flexible, composite, mandrels described herein is the elimination, or at least reduction, therewith, of problems resulting from stresses on the hose walls when such hose is coiled on take-up reels while the hose is still on the mandrel. These stresses are subtantially reduced when using the more flexible composite mandrel described herein as compared to the substantially less flexible, solid flexible mandrels previously known.

Furthermore, the pre-stressed inner core 2 results in the construction of a more uniform, i.e., void free, mandrel, reducing to a minimum or eliminating completely any voids caused by cooling of the thermoplastic sleeve material from the outside inwardly. Such cooling normally results in the formation of an outer shell of substantially final size formed around the hot, liquid inner layers of sleeve 3 which have the tendency to shrink during solidification, resulting in possible voids within the mandrel. Any such voids are however filled by the outwardly expanding material of core 2 when tension on the latter is released. It will be obvious, of course, that without departing from the spirit of this invention the core 2 may be formed with a longitudinally extending bore therethrough which may be conveniently plugged prior to the application of fluid pressure to expel the mandrel from inside a completed hose.

The foregoing concludes the detailed description of a particular embodiment of this invention and method of making the same. It will be obvious to those skilled in the art that various changes and modifications may be made without departing from this invention in its broader aspects, and it is, therefore, intended in the appended claims to cover all such changes and modifications as fall within the true spirit and scope of this invention.

Having thus described my invention, what I claim and desire to protect by Letters Patent is:

1. A composite flexible mandrel for the production of hose, and the like, comprising, in combination, an outer elongated flexible sleeve defining an elongated internal passage and having a realtively smooth outer surface displaying relatively low frictional characteristics; an inner core of more resilient material than said outer sleeve received in and substantially filling said internal passage, said inner core in relaxed condition, free of said sleeve, having a cross-sectional area at least slightly larger than the corresponding cross-sectional area of said passage whereby said inner core, received in said sleeve, is permanently maintained by the latter in at least slightly radially compressed condition in order to provide a more uniform mandrel.

2. A mandrel according to claim 1, wherein said sleeve consists of a material which is substantially denser than said core material.

3. A mandrel according to claim 1, wherein said sleeve consists of a relatively inelastic material.

4. A mandrel according to claim 1, wherein said sleeve has a smooth, substantially cylindrical, outer surface conforming substantially to the inside dimensions of a hose to be manufactured thereon.

5. A mandrel according to claim 1, wherein said inner core comprises elastomeric material and said outer sleeve comprises a high-temperature-resistant thermo-plastic material.

6. A mandrel according to claim 1, wherein said outer sleeve is tubular and defines an elongated internal passage, said core being cylindrical and haivng a diameter which in the relaxed condition of the core is at least slightly larger than the diameter of said passage whereby said core fills said passage and permanently presses radially outwardly against the wall thereof.

7. A composite flexible mandrel for the production of hose and the like, comprising, in combination, an otuer elongated flexible sleeve defining an elongated internal passage; an inner core of more resilient material than said outer sleeve received in and substantially filling said internal passage, said inner core, in relaxed condition, free of said sleeve, having a cross-sectional area at least slightly larger than the corresponding cross-sectional area of said passage whereby said inner core, received in said sleeve, is permanently maintained by the latter in at least slightly radially compressed condition; the material of said sleeve displaying a realtively high thermal coefficient of expansion and the amount of said compression of said core being chosen such that the radially outward pressure exerted by said core against said outer sleeve will persist even at the maximum expansion of said sleeve in response to temperature rises encountered during normal hose-making operation.

8. A mandrel according to claim 5, wherein said core consists of synthetic rubber and said sleeve consists of a polyamide resin.

References Cited

UNITED STATES PATENTS

| | | | |
|---|---|---|---|
| 620,286 | 2/1899 | Dodge | 29—130 |
| 1,671,763 | 5/1928 | Dickey | 29—130 |
| 2,203,752 | 6/1940 | Smith | 29—130 |
| 2,312,587 | 3/1943 | Price. | |
| 2,685,118 | 8/1954 | Hunter | 18—45X |
| 3,152,387 | 10/1964 | Macleod | 29—130 |

FOREIGN PATENTS

| | | |
|---|---|---|
| 444,253 | 3/1936 | Australia. |
| 552,872 | 12/1956 | Itlay. |
| 195,265 | 4/1938 | Switzerland. |

J. SPENCER OVERHOLSER, Primary Examiner

M. O. SUTTON, Assistant Examiner

U.S. Cl. X.R.

249—183